UNITED STATES PATENT OFFICE.

BRUNO PILORZ AND ROBERT OTTO FRITZ STANGE, OF HONOLULU, TERRITORY OF HAWAII; SAID PILORZ ASSIGNOR TO SAID STANGE.

METHOD OF DRYING BANANAS.

1,313,557.  Specification of Letters Patent.  Patented Aug. 19, 1919.

No Drawing.  Application filed March 28, 1918. Serial No. 225,383.

*To all whom it may concern:*

Be it known that we, BRUNO PILORZ and ROBERT OTTO FRITZ STANGE, subjects of the Empire of Germany, and residents, respectively, of Honolulu, city and county of Honolulu, Territory of Hawaii, have invented a new and useful Improvement in Methods of Drying Bananas, of which the following is a specification.

The invention relates to a new and useful process of treating bananas, and has for its object the preservation of bananas indefinitely in their original shape and flavor.

Our invention consists in the method or process hereinafter described and directly pointed out in the claim.

The process is carried out as follows:

The peeled ripe fruit is subjected to steam in a closed receptacle at a pressure ranging from five to ten pounds for a period of from five to fifteen minutes, depending on the ripeness of the fruit. This serves the following purposes: (a) to drive off part of the sugar (d-glucose) and pectin contained in the fruit, thus preventing the formation of a slimy, syrupy coating on the surface of the fruit which would make a proper drying of it impossible; (b) to coagulate the vegetable albumin of the fruit, thus increasing the keeping qualities of the dried fruit; and (c) to break the outer cells (cell-walls) of the fruit, thus facilitating the subsequent drying.

The first immediate result of this steaming is a thin liquid containing sugar and pectin in solution. This liquid is collected at the bottom of the closed receptacle.

We then expose the steamed fruit to a current of filtered warm air at a temperature progressing from 80 degrees to 120 degrees F. till the water content of fruit is lowered to 25% of its weight.

The resulting dried bananas, retaining their original shape and flavor are cooled: convenient quantities of them, such as one pound, two pounds, etc., are pressed under mild pressure into rectangular blocks and wrapped in an air-tight inclosure of wax paper to prevent microbial action. A suitable number of these packages is then assembled in a box and is ready for the consumer to be used in a way similar to other dried fruits.

Having thus described the nature of our invention, what we claim as new and desire to secure by Letters Patent of the United States, is:

A method of utilizing bananas which consists: first, in subjecting the ripe, peeled fruit to steam under pressure, whereby the albumin contained therein is coagulated, the outer cell walls broken and a part of the soluble solids of the fruit driven off in the form of a liquid formed by these solubles and the condensation water of the steam: second, in decreasing the moisture content of the steamed fruit to 25% by drying by means of warm, filtered air: third, in cooling and pressing the dried fruit: and, fourthly, in packing the same in air-tight packages.

Dated at Honolulu, T. H., on this 13th day of March, A. D., 1918.

BRUNO PILORZ.
ROBERT OTTO FRITZ STANGE.